April 5, 1966 D. F. BURDETT ET AL 3,245,040
DATA RECEIVING CIRCUIT
Filed April 21, 1958
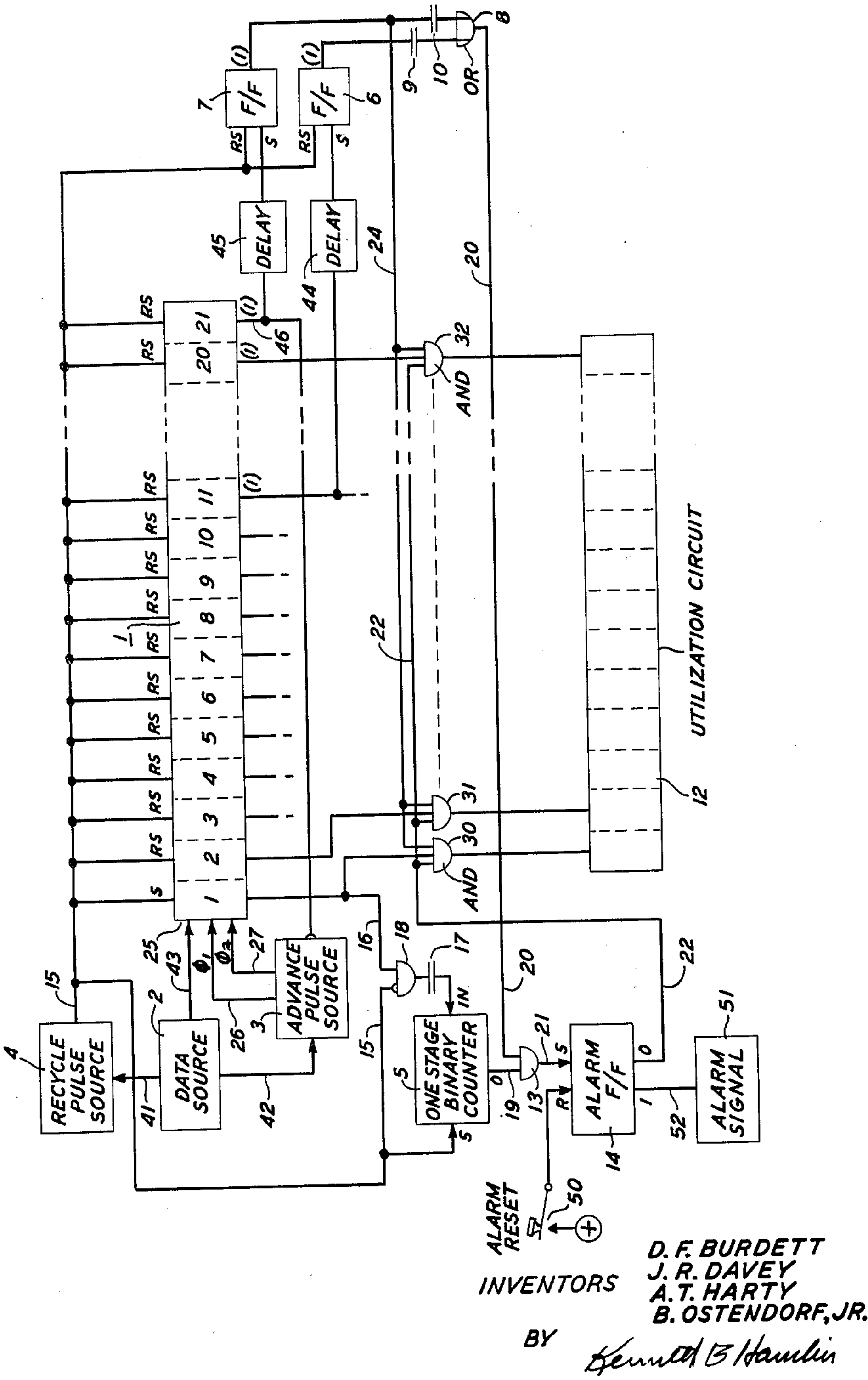
INVENTORS D. F. BURDETT
J. R. DAVEY
A. T. HARTY
B. OSTENDORF, JR.
BY Kenneth B. Hamlin
ATTORNEY 3,245,040

DATA RECEIVING CIRCUIT

David F. Burdett, Glenridge, James R. Davey, Franklin Township, Somerset County, and Austin T. Harty, Whippany, N.J., and Bernard Ostendorf, Jr., Stamford, Conn., assignors to Bell Telephone Laboratories, Incorporated, New York, N.Y., a corporation of New York
Filed Apr. 21, 1958, Ser. No. 729,717
3 Claims. (Cl. 340—172.5)

This invention relates in general to communication systems and more particularly to control arrangements for such systems.

High speed digital communication and data systems are widely accepted because of their extremely favorable transmission and resolution characteristics and such systems are further enhanced through the use of time division multiplexing to achieve economies in transmission media. Such systems, however, are not without special problems, an example being the problem of accurate timing in the handling of digital data both in transmitting and receiving arrangements.

Heretofore, in such systems, the timing and counting functionings have been divorced from the data circuits, and this has resulted in a less than optimum use of circuitry and undue circuit complexity.

Accordingly, it is an object of this invention to reduce the complexity of digital data systems.

It is another object of this invention to combine functions in system elements to effect savings in equipment.

It is a further object of this invention to more efficiently perform timing and counting functions in such systems.

It is still another object of this invention to increase the flexibility of timing and counting circuits employed in digital data systems.

Yet another object of the present invention is to more efficiently perform timing, counting and data checking functions in digital systems.

These and other objects of this invention are achieved in one specific illustrative embodiment wherein both system timing and data storage are performed in a single shift register. In the case of a data receiver, the shift register and other elements of the system are recycled just preceding the initiation of a message and in the recycling operation the shift register is set to a discrete initial pattern. The discrete initial pattern may in the simplest instance, be a "1" stored in the first stage of the shift register and "0's" stored in the remaining stages of the register or any other discrete pattern which can be readily recognized. As data is serially shifted into the receiving shift register, the initial "1," stored in the first stage, proceeds through the succeeding stages of the register. Circuit elements responsive to the setting of a shift register stage to the "1" state recognize the progress of the initial "1" through the register and, in accordance with the progress of the initial "1," provide timing or counting pulses to perform work operations such as to order a parity check or address recognition, or provide an indication that an entire message has been received. Accordingly, both data storage and timing or counting functions are achieved in a common shift register.

In accordance with one feature of this invention, a shift register, having a sufficient number of stages to store a complete message, or a separable section thereof, is employed both as a data storage device and as a timing or counting device and, in addition, is combined with circuitry for checking the parity of the message.

In accordance with another feature of this invention, a parity check of the message is accomplished by means of a single binary counter connected to the first stage of a receiving shift register in conjunction with signals derived from passage of a discrete initial pattern through the shift register.

In accordance with still another feature of this invention, information is transferred from the shift register to data utilization circuits only upon the occurrence of parity within the message and completion of the message.

The above and other objects and features of this invention will be fully understood when read with reference to the single figure drawing which shows a data receiver advantageously employing the teachings of this invention.

The circuit shown in the drawing is arranged to accept a binary message comprising two ten bit words. The message originates in the data source 2 and is in serial digital data form. The message is predetermined to have even parity in each of the words, that is, an even number of "1's" in each of the ten bit words. Failure of parity in either word initiates an alarm signal and prevents transfer of data from the shift register 1 to the data utilization circuit 12.

In the drawing, there is shown a data source 2 which provides a recycle signal on conductor 41, a start signal on conductor 42, and data signals on conductor 43. The shift register 1 has input, output, advance, and recycle terminals. The data source data conductor 43 is connected to the shift register input terminal 25. The data signal recycle conductor 41 is connected to the recycle pulse source 4 which provides a recycle pulse on conductor 15 under control of a signal on conductor 41. The energization of recycle conductor 15 establishes the proper initial conditions in the shift register 1 and prepares the attendant circuitry for receipt of a data message. The advance pulse source is set in step by a signal from the data source on conductor 42. The bistable circuits 6 and 7 are connected to the "1" output terminals of the eleventh and twenty-first stages of the shift register, and are set to their "1" state when their respective shift register stages have been set. The binary counter 5 is arranged to count the settings of the first stage of the shift register and is arranged to be set to its initial condition upon energization of the recycle pulse source 4. The alarm flip-flop 14 is arranged to be set to its "1" state upon the failure of parity in either of the received words, and the output AND gates represented by gates 30, 31, and 32 are energized whenever parity occurs in both words of the message and upon completion of the message. Energization of the output AND gates such as 30, 31, and 32 effects transfer of the information in the shift register to the data utilization circuit 12. The data utilization circuit 12 may consist of circuitry for further processing the message data or may advantageously consist of additional storage or display arrangements.

Just preceding the transmission of data over conductor 43, recycle pulse source 4 is energized by a start signal from the data source 2 over conductor 41. Energization of the recycle pulse source 4 provides an output signal on conductor 15 which is effective to set the first stage of the shift register; reset all remaining stages of the shift register; reset the flip-flops 6 and 7, which are connected to the eleventh and twenty-first stages of the shift register; set the binary counter 5 to its "1" state and inhibit gate 18. Gate 18 is inhibited upon recycling of the shift register and binary counter so that the setting of the first stage of the shift register will not provide an input pulse to the binary counter in conflict with the setting pulse on conductor 15. Accordingly, the shift register 1 is cleared of all prior data and the initial pattern consisting of a "1" in the first stage and a "0" in each of the remaining stages is established. Immediately after or coincident with the recycling of the shift register and its attendant logic circuitry, the advance pulse source is set in phase by a signal from the data source 2 over conductor 42. Accordingly, the shift register advance pulses over conductors 26 and 27 are arranged to occur at the center of the pulses from the data source 2 over conductor 43. The serial digital message follows and is shifted into the shift register. Each time the first stage of the shift register is set to its "1" state as the message data is shifted into the shift register, a signal is applied through gate 18 and condenser 17 to operate binary counter 5. The initial "1" which is set in the first stage at the time the circuit was recycled precedes the message data in the shift register, and when the eleventh stage has been set indicating the transfer of the initial "1" to that stage, the flip-flop 6 is set to its "1" state. The output signals from the "1" conductors of the eleventh and twenty-first stages of the shift register 1 are transmitted to flip-flops 6 and 7, respectively, through delay pads 44 and 45. Each of the delay pads 44 and 45 introduces a delay of a fraction of a bit period. Accordingly, the "1" output conductors of flip-flops 6 and 7 will not be energized until shortly after setting of the binary counter 5 has been completed.

As the data was shifted into the register, the binary counter 5 was advanced one count each time a "1" was shifted into the first stage. Accordingly, if even parity, that is an even number of "1's," is present in the first ten bits of the serial message, the binary counter will have been set and reset an even plurality of times so that it is in its "1" state when the initial "1" reaches the eleventh stage.

The setting of the flip-flop 6 to its "1" state applies a signal through the condenser 9 and OR gate 8, to conductor 20. This signal is combined with the "0" output signal on conductor 19 from binary counter 5. If the binary counter is in its "0" state at the time the signal caused by the setting of flip-flop 6 to its "1" state occurs, failure of parity is indicated and the alarm flip-flop 14 is set to its "1" state through the enablement of AND gate 13 and the accompanying energization of conductor 21. With alarm flip-flop 14 set to its "1" state, alarm signal 51 will be operated by a signal over the "1" output conductor 52 from alarm flip-flop 14. After operation, alarm flip-flop 14 is reset by the manual operation of alarm reset switch 50 which applies a potential to the reset lead of alarm flip-flop 14. If parity is present in the ten bits, the binary counter 5 will be in its "1" state and the alarm AND gate 13 will not be enabled, accordingly, alarm flip-flop 14 will remain in its "0" state and alarm signal 51 will not be operated.

As the remainder of the message, that is, the next ten bit word of the message, is shifted into the shift register, the initial "1" proceeds until it reaches the twenty-first stage. It should be noted that only the set terminal of the flip-flop 6 is connected to the shift register output terminal, therefore, subsequent transfer of "1's" and "0's" to the eleventh stage of the shift register will not affect the state of the flip-flop 6.

Transfer of the initial "1" to the twenty-first stage will set flip-flop 7 which is connected to the output terminal of the twenty-first stage. The signal derived from the setting of flip-flop 7 is transmitted through condenser 10, OR gate 8, and conductor 20 to the AND gate 13. If as in the previously described instance, the binary counter is in its "1" state, indicating presence of parity in the word just checked, the alarm AND gate 13 will not be enabled.

When the "1" output conductor 46 of the last stage of the shift register has been energized by the transfer of the initial "1" thereto, the advance pulse source 3 will be inhibited thereby preventing further transfer of information through the shift register.

When the initial "1" is shifted into the twenty-first stage, indicating the receipt of a complete message, the information stored in the first twenty stages of the shift register will be transferred to the data utilization circuit 12 if parity is present. Transfer is accomplished through the output AND gates represented by 30, 31, and 32. The D.C. state of the output conductor of the flip-flop 7 is used as a first enabling signal to the output AND gates such as 30, 31, and 32. The "0" output conductor of the alarm flip-flop is a second enabling lead to the AND gates 30, 31, and 32. If the alarm flip-flop is in its "0" state, indicating presence of parity, when the flip-flop 7 is set to its "1" state, indicating completion of a message, the output AND gates 30, 31, and 32 will be enabled to transfer the information stored in the first twenty stages of shift register 1 to data utilization circuit 12.

If parity has failed in either of the ten bit words of the message, the alarm flip-flop will have been set to its "1" state, thereby inhibiting AND gates 30 through 32 and thereby preventing transfer of the message to utilization circuit 12 when the initial "1" is shifted into the twenty-first stage of shift register 1.

The above arrangements are but one specific illustrative embodiment of an arrangement wherein the teachings of this invention are advantageously employed. It will be readily recognized that numerous other arrangements embodying the concepts of this invention may be devised by those skilled in the art without departing from the spirit and scope of the invention. For example, if it is desired, a more secure pattern consisting of other than an initial "1" may be employed. Further, the work operations timed through the progress of the initial "1" being shifted down the shift register are not limited to parity checking and transfer of the information to the data utilization circuit, but rather may include any of the other numerous functions required of control and timing circuits in a data handling system. For example, a signal may be derived from a shift register in this manner to request an address recognition test, a code plausibility test, recycle the system, or the performance of arithmetic or other logical operations with regard to data. Further, the teachings of this invention are not limited to the receiving arrangements shown herein, but rather may be advantageously employed in transmitting arrangements as well. For example, a discrete initial pattern may be inserted in a transmitting shift register along with message data that is to be transmitted serially. For example, a "1" may be inserted in the last stage of the register and another "1" inserted in a stage some number of stages away from the last stage. By way of example, a "1" may be inserted in the last stage and in the fifth from the last stage of the register. If it is established as a rule that only message data codes which have a "1" in at least every fourth bit are employed, it is possible to monitor the five stages closest to the transmitting end of the shift register and thereby determine when the last bit of the message has been transmitted. Accordingly, as the last bit of information is shifted out of the register, the transmitter may be shut down. In the case of a long message, this obviously saves a great deal of equipment since without the use of a discrete pattern accompanying the message data, it would be necessary to provide either a separate counting chain or to monitor all of the stages of the transmitting shift register.

It is noted that a sole divisional application Serial No. 166,133, filed Jan. 15, 1962, in the name of B. Ostendorf, Jr., is directed to certain aspects of the subject matter disclosed but not claimed herein.

What is claimed is:

1. In a communication system the combination comprising a plural stage shift register having input, advance and recycle terminals, each of said stages having an output terminal, a message data source connected to said shift register input terminal, recycle pulse source connected to said recycle terminals and under control of said data source for establishing a discrete initial pattern of electrical states of said stages of said shift register, said recycle pulse source effective to set the first stage of said shift register to the "1" state and to reset all other stages of said shift register to the "0" state, an advance pulse source connected to said shift register advance terminals, said advance pulse source under control of said message source, binary counting means connected to the output terminal of the first stage of said shift register, bistable circuit means connected to the output terminals of certain of said shift register stages, gating means responsive to said binary counting means and said bistable circuit means for checking parity in said message and alarm means responsive to said gating means for indicating failure of parity in said message.

2. In a communication system the combination comprising a data utilization circuit, a plural stage shift register having input, output, advance and recycle terminals, a message data source connected to said shift register input terminal, an advance pulse source connected to said shift register advance terminals, binary counting means having input and recycle terminals, said counting means input terminal connected to the output terminal of the first stage of said shift register, bistable circuit means having input and recycle terminals, said input terminal of said bistable means connected to the output terminal of another of said shift register stages for indicating the position of the message in said shift register, recycle means connected to said recycle terminals of said shift register, said binary counting means and said bistable means, an alarm circuit to indicate parity failure, first switching means responsive to said binary counter state and the state of said bistable circuit to enable said alarm means upon failure of parity in said message, and second switching means connected between said shift register output terminals and said data utilization circuit and controlled by said alarm means and said bistable circuit means to effect transfer of information from said shift register to said data utilization circuit.

3. In a communication switching system the combination comprising a plural stage shift register having input, advance and recycle terminals, each of said stages having an output terminal, a serial data message source connected to said input terminal, an advance pulse source connected to the advance terminals of said shift register and under control of said data source, a recycle pulse source connected to the recycle terminals of said shift register for establishing a discrete initial pattern of electrical states of said shift register stages, binary counting means connected to the output terminal of the first stage of said shift register, gating means interposed between said first stage output terminal and said binary counting means, said gating means inhibited by a signal from said recycle pulse source, bistable circuit means connected to the output terminals of certain of said stages of said shift register, delay means interposed between said output terminals of said certain stages of said shift register and said bistable circuit means, the reset terminals of said bistable circuit means being connected to said recycle pulse source, gating means connected to the output terminal of said binary counting means and the output terminals of said bistable means for checking parity in said message, bistable alarm means responsive to the output of said gating means, said bistable alarm means set to the "1" state upon failure of parity in said message, a data utilization circuit; and a plurality of gate means under joint control of said alarm bistable means and one of said bistable means connected to said certain output terminals for gating the message in said shift register in parallel to said data utilization circuit.

References Cited by the Examiner

UNITED STATES PATENTS

| | | | |
|---|---|---|---|
| 2,803,812 | 8/1957 | Rajchman | 235—61 |
| 2,969,522 | 1/1961 | Crosby | 340—172.5 |

ROBERT C. BAILEY, *Primary Examiner.*

CHESTER L. JUSTUS, IRVING L. SRAGOW, STEPHEN W. CAPELLI, MALCOLM A. MORRISON, FREDERICK M. STRADER, *Examiners.*